April 7, 1964  I. J. YERMISH  3,127,814
MILLING ATTACHMENT
Filed March 12, 1962  2 Sheets-Sheet 2

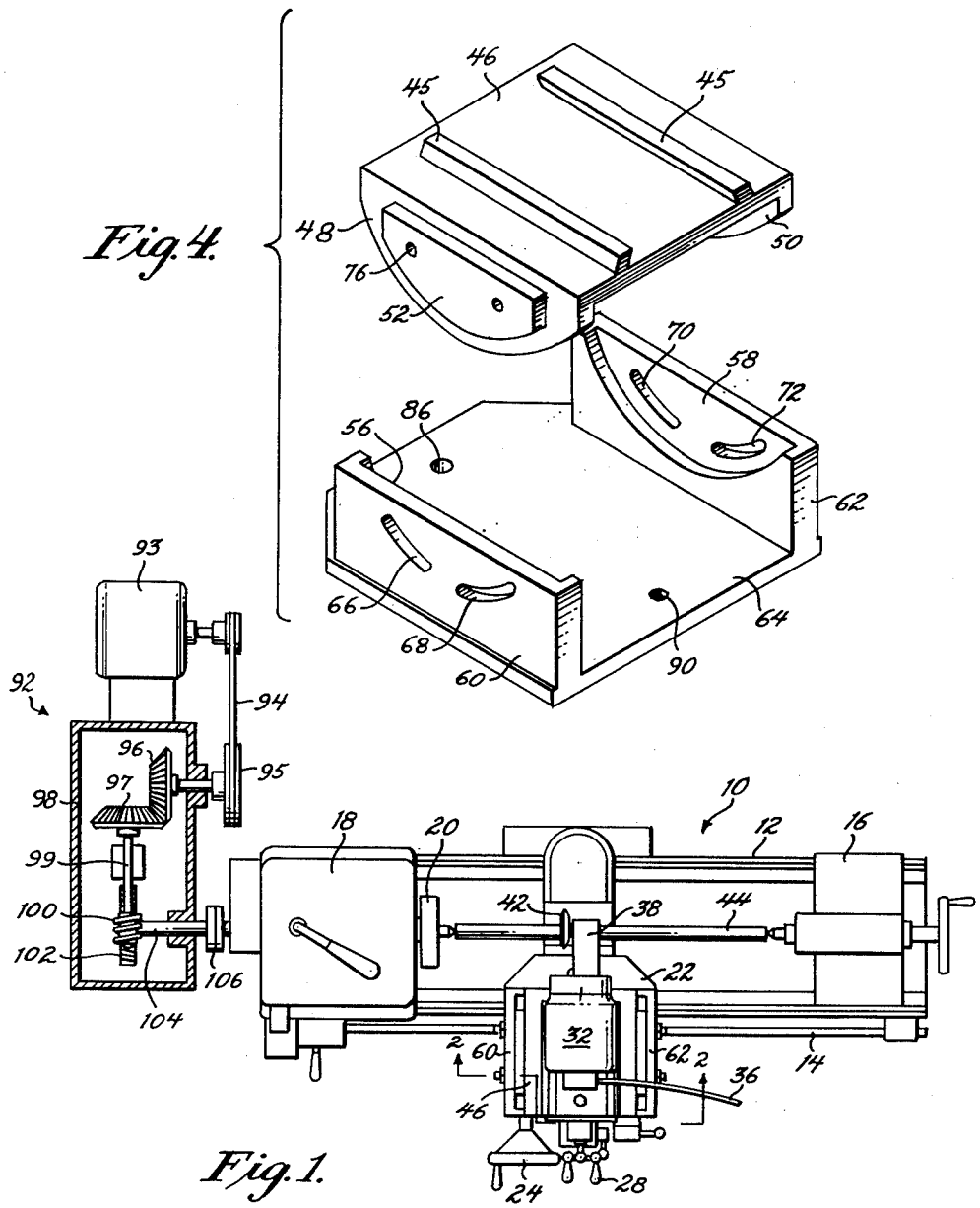

INVENTOR.
ISRAEL J. YERMISH
BY
ATTORNEY.

United States Patent Office 3,127,814
Patented Apr. 7, 1964

3,127,814
MILLING ATTACHMENT
Israel J. Yermish, Philadelphia, Pa., assignor to Fenway Machine Co., Inc., Philadelphia, Pa., a corporation of Pennsylvania
Filed Mar. 12, 1962, Ser. No. 178,921
1 Claim. (Cl. 90—17)

This invention relates to a thread miller, and more particularly, to a thread miller attachment capable of being utilized with a conventional lathe.

Milling attachments capable of being utilized with conventional lathes to facilitate the threading of hard or difficult to machine articles have been proposed heretofore. For example, such attachment is illustrated in U.S. Patent 2,776,604. In this patent, the milling attachment and its relationship with the lathe disclosed therein suffers from certain disadvantages. For example, the attachment in said patent is only capable of having the cutting tool engage the workpiece from a side of the workpiece. Certain types of materials are more advantageously and more rapidly cut if the cutting tool is rotatably supported above the workpiece or below the workpiece. The present invention overcomes this disadvantage by mounting the cutting tool on a pivotably mounted support which facilitates rotation of the cutting tool and its drive means in a plane perpendicular to the axis of rotation of the workpiece. In the last mentioned patent, the drive means for the cutting tool is provided with a transmission facilitating the coupling of motive power to an auxiliary drive for the lathe chuck by means of a flexible shaft. The last mentioned flexible shaft is disposed in a position whereby it interferes with close observation of the cutting action. In operation, said flexible shaft is disposed opposite one's chest or stomach. As the motor power increases, the flexible shaft tends to whip back and forth thereby providing a source of danger to the lathe operator.

The thread miller attachment of the present invention is less complicated than the attachment shown in the above mentioned patent, provides for a greater selection of low speeds thereby eliminating chatter during the cutting operation, enables the operator to be closer to the work during the cutting action, and is easier and faster to set up. The pivotable mounting of the support for the cutting tool and its drive means facilitates the thread milling of a wider rage of materials including brittle plastics, fiberglass, nylon, beryllium, stainless steel, titanium, etc.

It is an object of the present invention to provide a novel thread milling attachment.

It is another object of the present invention to provide a novel thread milling attachment capable of rotative movements so that it may contact the workpiece from above, below or from a side.

It is another object of the present invention to provide a novel thread miller attachment which is simpler than those proposed heretofore while enabling an operator to be closer to the workpiece.

It is another object of the present invention to provide a novel milling attachment which is faster to set up and eliminates chatter.

It is another object of the present invention to provide a simple milling attachment capable of being utilized with lathes to thread mill brittle materials.

It is another object of the present invention to provide a thread milling attachment adapted to be utilized with a lathe, and capable of being rotated in a plane substantially perpendicular to the longitudinal axis of a workpiece in a chuck on the lathe.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a top plan view of a lathe, with the milling attachment of the present invention and an auxiliary drive shown partially in section.

FIGURE 4 is an exploded view of the C-shaped base and support plate which facilitates rotary movement of the cutting tool and its drive means.

Referring to the drawing in detail, wherein like numerals indicate like elements, there is shown in FIGURE 1 a lathe designated generally as 10.

Figure 3:
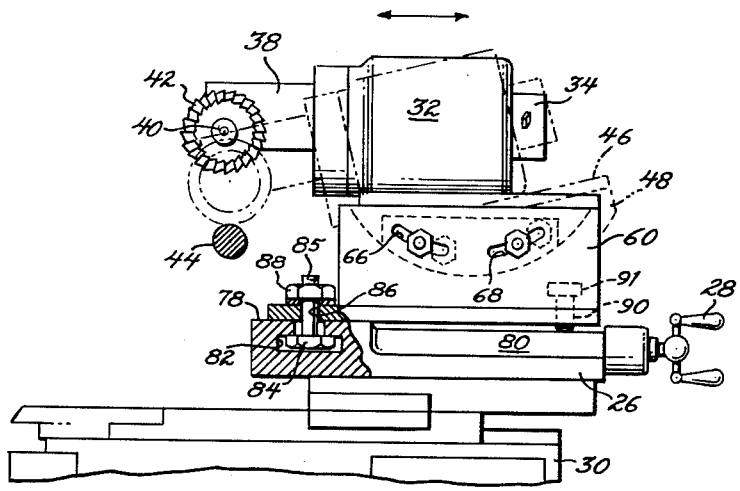
FIGURE 3 is a view taken along the lines 3—3 in FIGURE 2.

The lathe 10 is provided with a pair of ways on a horizontally disposed bed 12. A lead screw 14 extends along and parallel to the bed 12. The lathe 10 is provided with a tailstock 16 and a head stock 18 at opposite ends thereof. The headstock 18 includes a conventional motor for rotatably driving the spindle on which is disposed a chuck 20.

The lathe 10 is provided with a saddle-type carriage 22 which is reciprocably disposed on the ways and interconnected with the lead screw 14. The carriage 22 is provided with a hand wheel 24 to facilitate manual reciprocation of the carriage 22 with respect to the bed 12. The carriage 22 also supports a tool post compound 26. The compound 26 is rotatably mounted on the lower compound 30 of the carriage 22 and is provided with a ball crank 28 to facilitate reciprocation of the compound 26 in a direction perpendicular to the ways on the bed 12.

An electric motor 32 is supported above the tool post compound 26 in a manner to be described in greater detail hereinafter. The motor 32 is provided with a switch 34 on one end thereof. The switch 34 is connected to a source of potential by means of an electrical conduit 36. The output shaft of the motor 32 is coupled to a transmission disposed within the housing 38 which extends from the end of the motor 32 remote from the switch 34. The transmission and the housing 38 is coupled to an output shaft 40 which terminates in a cutting tool 42. The cutting tool 42 is provided with peripheral teeth to facilitate cutting or otherwise machining the workpiece 44.

Figure 2:
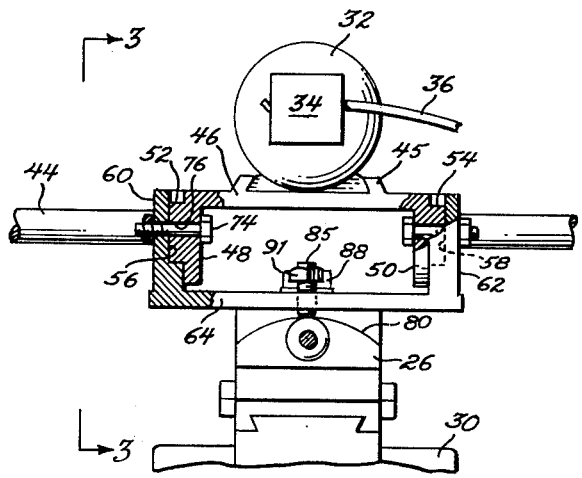
FIGURE 2 is a sectional view taken along lines 2—2 in FIGURE 1.

As shown more clearly in FIGURES 2 and 4, the motor 32 is provided with a mounting flange disposed between spaced parallel angled ridges 45 on the upper surface of a C-shaped base 46. The base 46 is provided with depending arms 48 and 50. The lower edges of the arms 48 and 50 are arcuate.

As shown more clearly in FIGURES 2 and 4, a boss 52 projects outwardly from a side face of the arm 48 and a boss 54 projects outwardly from a side face of the arm 50. The bosses 52 and 54 are provided with arcuate bottom surfaces. The boss 52 is adapted to rotate in an arcuate recess 56 on the inner surface of a wall 60. The boss 54 is adapted to rotate in an arcuate recess 58 in a wall 62.

The walls 60 and 62 are substantially parallel to one another and are upright with respect to a flat horizontally disposed support plate 64. The wall 60 is provided with a pair of arcuate slots 66 and 68. The wall 62 is provided with a pair of similar slots 70 and 72. The slots 66–72 extend through the reduced thickness portion formed by the arcuate recesses 56 and 58 in the walls 60 and 62, respectively.

A pair of holes 76 extend through the arm 48 and boss 52. A similar pair of holes extend through the boss 54 and arm 50. A bolt 74 is adapted to extend through each of the holes 76 and one of the slots 66–72. Hence, it will be seen that the C-shaped base 46 and the motor 32 may be rotated from the solid line position to the phantom position illustrated in FIGURE 3 by merely loosening the nuts on the ends of the bolts 74.

As shown more clearly in FIGURE 3, the conventional tool compound 26 is provided with a flat front end 78 and an arcuate top surface 80 extending therefrom. A T-shaped slot 82 is provided in the front end of the tool compound 26. The head of a bolt 84 is disposed within the slot 82 with the shank portion 85 of the bolt extending upwardly through a hole 86 in the support plate 64. A nut 88 is threadedly engaged with the end of the shank portion 85. A washer is disposed between the nut 88 and the uppermost surface of the support plate 64. Hence, as the tool compound 26 reciprocates in a direction perpendicular to the axis of rotation of the workpiece 44, the motor 32, C-shaped base 46 and the support plate 64 will reciprocate therewith.

A threaded hole 90 is provided in the support plate 64 adjacent a rear end thereof. A threaded shank on a bolt 91 extends through and is in meshing engagement with the internal threads of the hole 90. The free end of the shank of the bolt 91 engages the arcuate top surface 80 on the tool compound 26. Adjustment of the bolt 91 will assure that the support plate 64 is disposed in a horizontal plane.

The motor within the headstock 18 of the lathe 10 is interconnected with the chuck 20 in a manner so that the chuck 20 rotates too fast for thread milling certain types of materials. Accordingly, the lathe 10 is provided with an auxiliary drive means 92. The auxiliary drive means 92 includes a motor 93 having an output shaft terminating in a pulley. A drive belt 94 extends around said pulley and a pulley 95. The pulley 95 is at one end of a rotatably mounted shaft. A beveled gear 96 is secured to the other end of said last mentioned shaft. The beveled gear 96 is in meshing engagement with a beveled gear 97 within an enclosure 98. The gear 97 is at one end of a rotatably supported non-reciprocating shaft 99 which terminates in a wormscrew 100. The wormscrew 100 is in meshing engagement with the periphery of a helical gear 102.

The helical gear 102 is fixedly secured to a rotatably mounted shaft 100 extending through a wall of the enclosure 98. A manually adjustable clutch 106 is provided between the shaft 104 and the spindle of the headstock 18. Hence, the auxiliary drive means 92 may be selectively coupled to the spindle of the headstock 18 to rotatingly drive the chuck 20 at very low speeds thereby facilitating the thread milling of brittle materials.

Switch 34 for motor 32 and the switch (not shown) for the motor 93 are preferably selectively operable switches providing for a range of speeds. By varying the speed of the motors 32 and 93, various combinations of cutting speeds and rotative speeds for the workpiece 44 may be attained so that brittle materials may be cut more efficiently without chatter. Since the tool compound 26 is rotatably supported on the lower compound 30, the angle with which the cutting tool 42 engages the workpiece 44 may be varied. Since the C-shaped base 46, motor 32 and cutting tool 42 are rotatably supported by the arms 60 and 62 of the support plate 64, the cutting tool 42 may engage the periphery of the workpiece 44 above, below, or to one side of the axis of rotation of the workpiece 44. This last-mentioned relationship is desirable since it enables certain brittle materials to be cut more efficiently with less chatter.

It is believed that the manner in which the milling attachment of the present invention is utilized is obvious to those skilled in the art, and especially in the view of the above-mentioned patent. It will be noted that the present invention eliminates the flexible shaft in the above-mentioned patent thereby enabling the lathe operator to more closely observe the cutting action of the cutting tool 42. This feature is desirable since many lathe operators do not utilize the automatic stop for the length of the cut desired. Instead, many operators utilize the handwheel 24 to reciprocate the carriage 22. Therefore, it is necessary for the operator to be able to closely observe the cutting action and the length of cut which has been made. Since the flexible shaft illustrated in the above-mentioned patent has been eliminated, the milling attachment is more easily set up by the operator.

The present invention may be embodied in other specific forms without departing from the spirit or essential attributes thereof and, accordingly, reference should be made to the appended claim, rather than to the foregoing specification as indicating the scope of the invention.

I claim:

In a milling attachment for a lathe having a rotatable chuck, a self contained auxiliary drive means at one end of said lathe for rotating said chuck at slow speeds, a carriage on said lathe, and a tool compound on said carriage, the attachment comprising, a support plate mounted on said tool compound, a motor, a base coupled to said motor, said base being selectively pivotably coupled to said support plate, said base providing selective arcuate movement about an axis substantially parallel to the axis of rotation of said chuck, a cutting tool coupled to said motor for cutting materials supported at least in part by said chuck, said support plate being U-shaped and having upwardly extending parallel arms, the inner surfaces of said upwardly extending parallel arms being indented to form arcuate guide surfaces thereon, said base having downwardly extending parallel arms, said downwardly extending parallel arms having arcuate support surfaces formed thereon for cooperation with said upwardly extending parallel arm guide surfaces, locking means extending through at least one pair of cooperating arms of said base and support plate to lock said base in a predetermined position with respect to said support plate.

References Cited in the file of this patent

UNITED STATES PATENTS

| | | |
|---|---|---|
| 969,388 | Miles | Sept. 6, 1910 |
| 1,719,689 | Buehrle | July 2, 1929 |
| 2,497,170 | Hite | Feb. 14, 1950 |
| 2,502,851 | Jones et al. | Apr. 4, 1950 |
| 2,616,338 | Manning | Nov. 4, 1952 |
| 2,651,239 | Schlagel | Sept. 8, 1953 |

FOREIGN PATENTS

| | | |
|---|---|---|
| 272,016 | Switzerland | Feb. 16, 1951 |